United States Patent [19]

Milo

[11] 4,163,462
[45] Aug. 7, 1979

[54] TEST PLUG

[75] Inventor: August Milo, Elizabeth, N.J.

[73] Assignee: Universal Valve Co., Inc., Elizabeth, N.J.

[21] Appl. No.: 849,319

[22] Filed: Nov. 7, 1977

[51] Int. Cl.² ............................................. F16L 55/12
[52] U.S. Cl. ...................................... 138/90; 277/113
[58] Field of Search ....................... 138/90, 89, 91, 95; 277/113

[56] References Cited

U.S. PATENT DOCUMENTS

| | | | |
|---|---|---|---|
| 595,189 | 12/1897 | Mern | 138/90 |
| 1,808,411 | 6/1931 | Hinkston | 138/90 |
| 3,326,243 | 6/1967 | Augustus | 138/90 |
| 3,704,729 | 12/1972 | Tomlinson | 138/90 |

*Primary Examiner*—Lenard A. Footland
*Attorney, Agent, or Firm*—Weiser, Stapler & Spivak

[57] ABSTRACT

A test plug for sealing an internal passageway of a vessel preparatory to pressure testing the vessel with a fluid. The test plug is particularly designed for use with vessels that are installed below ground level, and is of the type that can be actuated from ground level to provide the desired sealing function. When the plug is intended to seal an internally threaded passageway of the vessel, it includes an externally threaded seal plate that is rotated into threaded engagement with the internal threads by an upstanding stem that is secured to the seal plate for operation from ground level. The seal plate carries an annular compressible gasket adjacent its lower surface, and a squeeze plate is positioned beneath the gasket for movement in an upward direction to compress the gasket against the lower surface of the seal plate. The gasket compression causes lateral expansion of the gasket into sealing engagement with the internal wall of the vessel passageway. In order to move the squeeze plate in an upward direction towards the seal plate, it is connected to an actuating rod that extends upwardly through a passage in the seal plate so that it also is responsive to operation from ground level.

19 Claims, 2 Drawing Figures

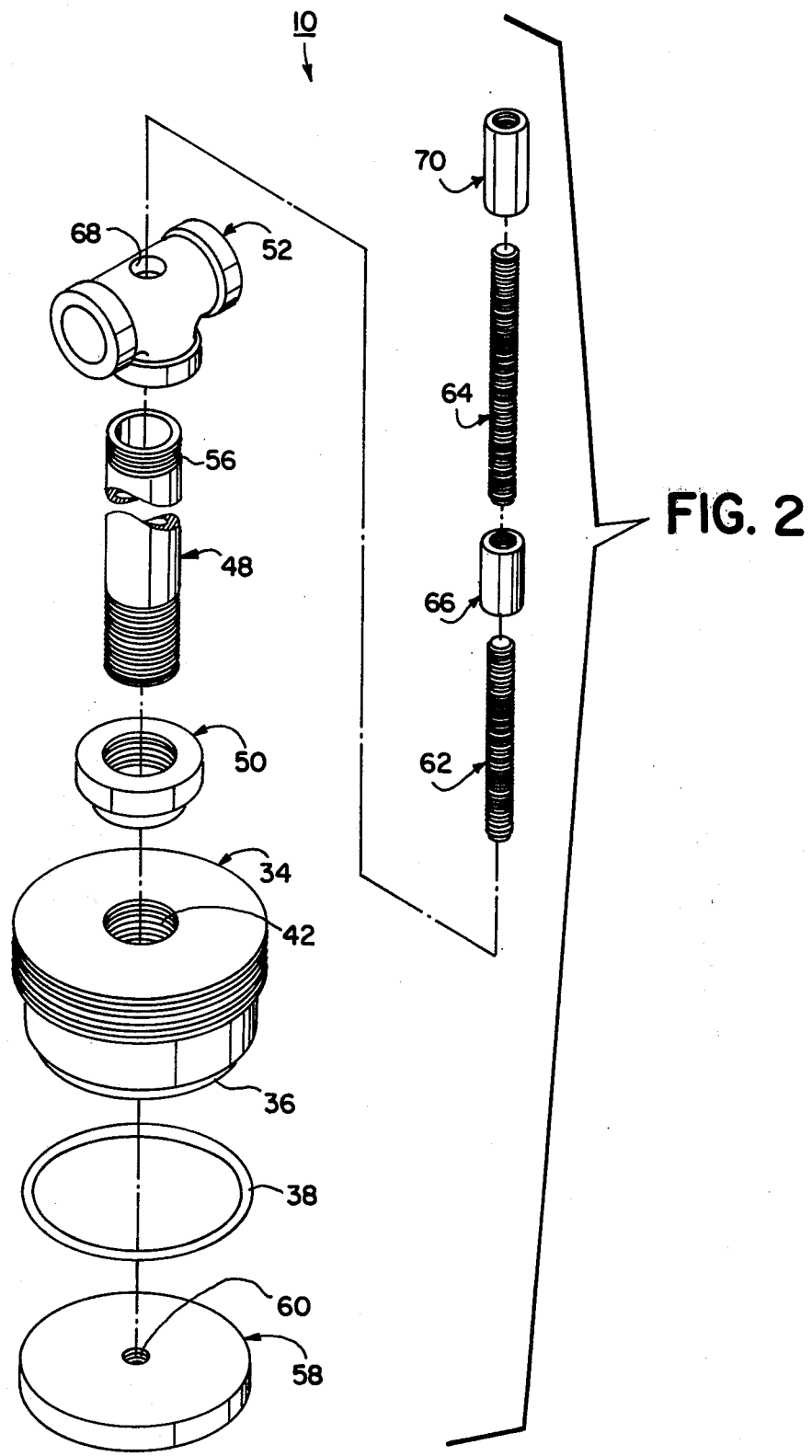

TEST PLUG

BACKGROUND OF THE INVENTION

This invention relates to a test plug, and more specifically to a test plug for sealing an internal passageway of a vessel preparatory to pressure testing the vessel with a fluid, either a liquid or gas. This invention is particularly well suited for use in testing, from ground level, vessels such as gasoline tanks, that are installed beneath ground level. Specifically, the test plug of this invention can be used to carry out such tests without in any way disturbing the underground piping connections to these vessels.

Reference throughout this application to "vessels," unless indicated to the contrary, is intended to cover all types of devices including an interior area that is intended to be sealed preparatory to carrying out either hydrostatic or pneumatic internal pressure tests. For example, the vessels can be tanks, pipelines, boilers, as well as other structures having an interior area to be tested, as indicated above.

It is often desirable to periodically pressure test vessels to determine whether the connections, seams, rivets or other fastening means will continue to hold a preselected pressure without leaking. This is particularly important in vessels that are intended to carry, or store highly flammable materials such as gasoline.

When carrying out a pressure test of gasoline tanks, it is necessary to temporarily seal the various passageways that communicate with the tank interior, and introduce a fluid under pressure through one of these passageways. A pressure gauge generally is employed in the line through which the pressurizing fluid is introduced so that the pressure test can be carried out at the desired preselected pressure level. When the passageway to be temporarily sealed is internally threaded, it is highly desirable, if not mandatory, to employ an externally threaded seal member as a part of the test plug assembly. Also, when the tank is installed underground, it is important to be able to insert and actuate the test plug from ground level without disturbing the tank piping connections and without excavation. It is believed to be most desirable to form the test plug with a compressible sealing gasket, preferably in the form of a conventional O-ring, that is forced into sealing engagement with the interior surface of the vessel passageway when the plug is actuated. The greatest versatility is achieved by designing the plug so that it can be inserted into a vessel passageway and actuated to perform its sealing function in separate operations.

Many different types of test plugs are known in the prior art, as exemplified by the disclosures in U.S. Pat. Nos. 2,636,514 (Woodward); 1,644,118 (Florence); 3,483,894 (Finocchiaro) and 2,886,067 (Maxwell et al). However, these devices are deficient in one or more ways in meeting the objectives of this invention.

In the Woodward test plug, the annular sealing gasket seats against the upper wall of the passageway, not against an interior wall as is preferred in this invention. Moreover, the operation of inserting the device into the passageway also forces the gasket into its sealing position. The steps of inserting the device and actuating the gasket cannot be separated.

The Florence and Finocchiaro test plugs are not suitably designed for sealing an internally threaded passageway of a vessel; particularly because neither includes an externally threaded member that can cooperate with the internal threads. Furthermore, both of these test plugs are designed to use specially designed sealing rings including internally tapered surfaces. They would not function as well as with conventionally formed O-rings of the type that are usable in this invention.

The Maxwell et al test device, like the Florence and Finocchiaro devices, is not designed for sealing an internally threaded passageway of a vessel. The Maxwell device includes elements that must cooperate with the exterior surface of the vessel in order for the sealing operation to be carried out.

None of the above devices is particularly designed for the pressure testing of vessels installed below ground level.

SUMMARY OF THE INVENTION

The present invention relates to a unique test plug for sealing an internal passageway of a vessel preparatory to pressure testing the vessel with a fluid. Of particular significance is the fact that the plug is constructed so that it can be operated at ground level to seal a vessel positioned below ground level. For example, the preferred test plug of this invention is very well suited for use in sealing the internally threaded passageway of a gasoline tank, for example, the internally threaded passageway of a tank connected coupling. Such couplings are normally employed to retain an extractor vent valve of the type that is open to permit gasoline vapors to escape while the tank is being filled and that is closed when the tank is full, to prevent the overflow of gasoline. The test plug of this invention can be used to temporarily seal the internally threaded passageway of the coupling designed and designated the No. V-420 extractor vent valve by the Universal Valve Company of Elizabeth, N. J. This vent valve is designed so that an operator can remove it from above ground level.

The preferred test plug of this invention includes an externally threaded seal plate that engages internal threads of a vessel passageway when the vessel is being pressure tested with a fluid. An inserting stem is connected to the seal plate and extends upwardly therefrom so that it can be rotated from above ground level to make up the threaded connection between the seal plate and the passageway. An annular compressible gasket, such as a conventional O-ring, is positioned adjacent a lower surface of the seal plate and is adapted to be compressed against this surface by a squeeze plate underlying the gasket. The squeeze plate is moved upwardly to compress the gasket by an actuating mechanism that, like the inserting stem, also can be operated from above ground level. This causes the gasket to expand laterally into sealing engagement with the interior surface of the vessel passageway to prevent fluid leakage thereabout.

In a preferred embodiment of this invention, the actuating mechanism for the squeeze plate extends upwardly through an interior passage in the seal plate and can be operated independently of the inserting stem to force the gasket into sealing engagement with the interior of the passageway. Therefore, the plug inserting and gasket sealing operations can be carried out independently of each other. This also permits the internal seal provided by the gasket to be released independently of the removel operation in which the seal plate is unthreaded from the passageway. In this manner, the firm threaded connection between the plug and passageway is maintained as the internal pressure is gradually relieved through operation of the squeeze plate actuating mechanisms.

Therefore, it is an object of this invention to provide a simple and reliable test plug of the aforesaid type.

It is a further object of this invention to provide a test plug that can be completely inserted within the threaded passageway of a vessel prior to moving a compressible sealing gasket of the plug into engagement with the interior of said passageway.

It is a further object of this invention to provide a test plug in which the sealing force of a gasket against the interior walls of an internally threaded vessel passageway can be relieved without the necessity of unthreading the plug from the passageway.

It is a further object of this invention to provide a test plug of the type that employs a compressible annular sealing gasket for sealing against the interior surface of a vessel.

It is a further object of this invention to provide a test plug of the type that can be threaded into engagement with internal threads of a vessel passageway, and thereafter independently actuated to force a compressible sealing ring into sealing engagement with the interior surface of the passageway.

It is a further object of this invention to provide a test plug of the type that can be operated at ground level to seal the passageway of a vessel installed below ground.

It is a further object of this invention to provide a test plug that is operable at ground level for sealing an internal passageway of a vessel that is mounted below ground level, without the necessity of disturbing the underground installation of said vessel.

It is further object of this invention to provide a test plug that is simple in design, inexpensive in manufacture and trouble-free when in use.

Other objects and a fuller understanding of the invention will be had by referring to the following description and claims of a preferred embodiment thereof, taken in conjunction with the accompanying drawings, wherein like reference characters refer to similar parts throughout the several views, and in which:

BRIEF DESCRIPTION OF THE DRAWINGS

FIG. 2 is an exploded, isometric view of the test plug of this invention showing the different elements employed in its construction.

DESCRIPTION OF THE PREFERRED EMBODIMENT OF THE INVENTION

Figure 1:
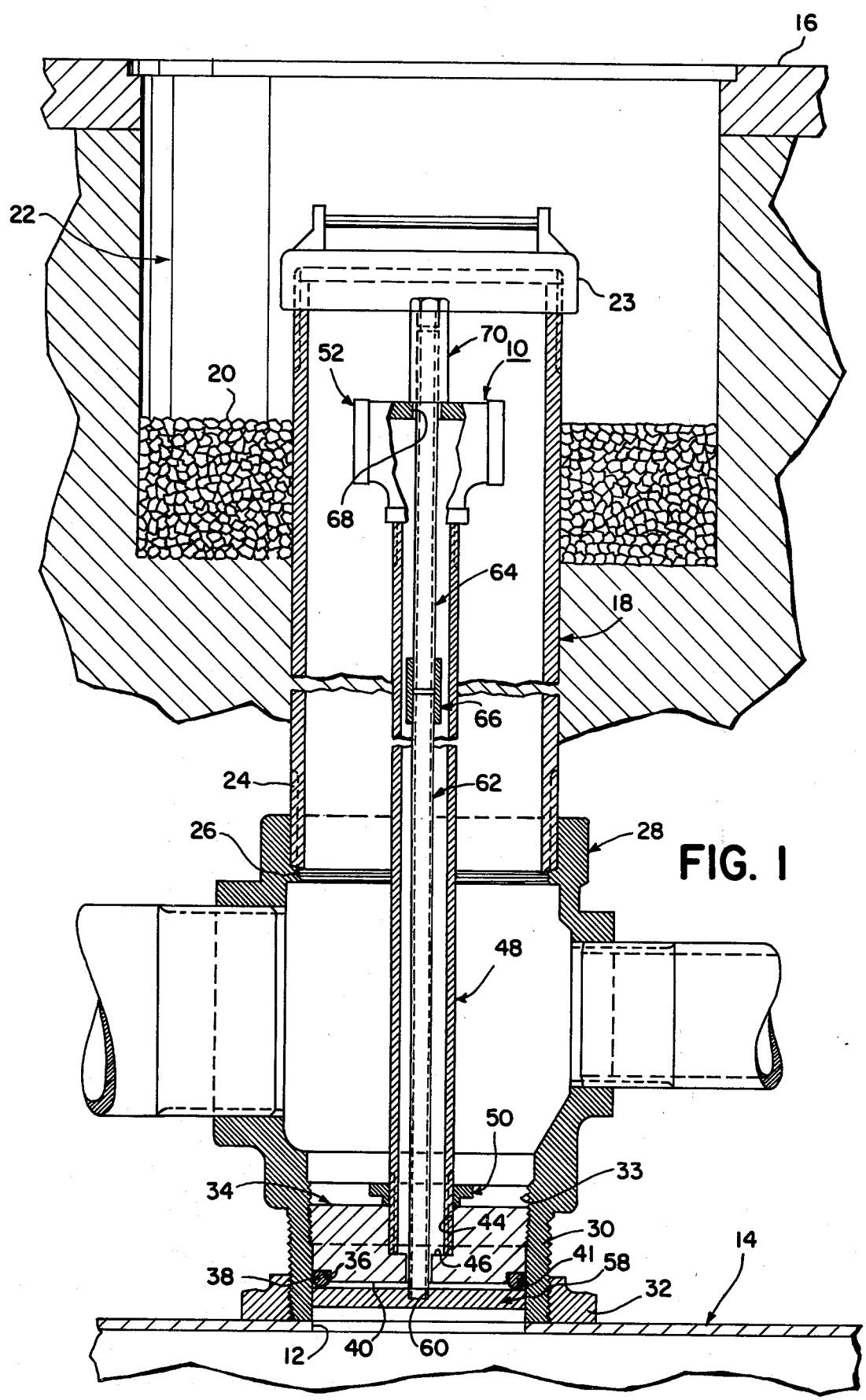
FIG. 1 is a longitudinal sectional view showing the test plug of this invention connected to an internally threaded passageway associated with a tank installed below ground level.

Although specific terms are used in the following description for the sake of clarity, these terms are intended to refer only to the particular structure of the invention selected for illustration in the drawings, and are not intended to define or limit the scope of the invention.

The preferred form of this invention is a test plug that is intended to temporarily close, or seal, a threaded opening that communicates with the interior of a vessel that requires hydrostatic or other internal pressure tests.

Referring to FIG. 1, in accordance with this invention, a test plug 10 is mounted in a position to seal an opening 12 extended through a side wall of a tank 14. In the illustrated embodiment, the tank 14 is utilized for storing gasoline, and is installed as an underground installation below ground level 16. The test plug 10 is positioned to seal the opening 12 by inserting it from above ground level, through a conventional standpipe 18 that extends through a gravel layer 20 into a manhole 22. A conventional threaded cap 23 closes the standpipe when there is no need to have access into it. The standpipe includes an externally threaded lower end 24 that is joined to an internally threaded upper section 26 of a fitting 28. This fitting normally accommodates a float vent valve and may be the Universal Valve Company No. V-420 extractor vent valve referred to earlier. In order to utilize the test plug 10 of this invention, the above float vent valve is removed from its position within the fitting 28 in a well known manner.

The fitting 28 includes a lower, externally threaded hub 30 that is secured within an internally threaded opening of a conventional tank flange 32. This later flange is joined to the outer wall of the tank 14 by a suitable means, such as by welding. The fitting 28 also includes an internally threaded section 33 that can be employed to cooperate with an externally threaded section of a float vent valve such as employed in the above-mentioned No. V-420 extractor vent valve.

Referring to FIGS. 1 and 2, the test plug 10 of this invention includes an externally threaded seal plate 34 which is provided with an annular groove 36 at the periphery of its lower surface. An annular sealing ring, preferably in the form of a conventional compressible O-ring 38, is mounted within the groove 36, and projects beyond the bottom wall 40 of the seal plate. The manner is which the O-ring is deformed into sealing engagement with the interior surface 41 of the hub 30 will be explained hereinafter in detail.

The seal plate 34 has a pasageway 42 extending through it, and the passageway is counterbored to provide an enlarged, internally threaded upper section 44 that terminates in an upwardly facing shoulder 46. This upper section 44 receives a lower threaded end of a hollow test plug inserting stem 48 which preferably is in the form of a hollow pipe.

The inserting stem 48 is threaded into the seal plate 34 until its lower surface seats against the upwardly facing shoulder 46. An internally threaded nipple 50 cooperates with the external threads on the outer surface of the stem 48, and is tightened into engagement with the upper surface of the seal plate 34 to prevent the accidental separation of the stem from the seal plate. The upper end of the stem 48 is externally threaded at 56 to threadedly engage the internal threads of a handle 52 which preferably may be in the form of a hollow T-coupling.

The test plug 10 further includes a seal forming squeeze plate 58 positioned beneath the seal plate 34. This squeeze plate 58 includes an internally threaded opening 60 for threadedly receiving one end of a threaded actuating rod 62. When required by the depth of the tank 14 beneath ground level 16, a second threaded actuating rod 64 can be connected to the first rod 62 through an extension coupling 66. In the illustrated embodiment, the second threaded rod 64 extends upwardly through an opening 68 provided in the upper wall of the hollow T-coupling 52. The end of the rod 64 that projects beyond the opening 68 receives an internally threaded actuating member, such as a hex nut 70.

Having described the structure of the unique test plug 10, its mode of operation will now be explained.

It is very desirable to periodically pressure test gasoline tanks to insure that the seams and connections will hold a preselected pressure without leakage. In order to carry out such a test with the test plug 10, the extractor vent valve (not shown) is removed from its connection with the internally threaded section 33 of the valve fitting 28. Thereafter, the test plug 10 can be inserted through the standpipe 18 until the seal plate 34 reaches the level of the internally threaded section 33. Prior to inserting the test plug into the standpipe, it is preferred to apply a sealant to the external threads of the seal plate 34, and to grease or oil the O-ring 38.

When the externally threaded seal plate 34 reaches the level of the internally threaded section 33, the test plug 10 can be turned in a counterclockwise direction through the T-coupling 52 until the first thread of the seal plate 34 drops into proper position. Thereafter, the seal plate 34 is rotated in a clockwise direction until it reaches the lower end of the internally threaded section 33 of the fitting 28, as is shown in FIG. 1. The test plug 10 is now in position to be actuated to complete its sealing function.

In order to force the O-ring 38, into its sealing position, a wrench or other similar tool, is employed to rotate the hex nut 70 in a direction that will cause the threaded rods 64 and 66 to move in an upward direction, as viewed in FIG. 1. This will pull the squeeze plate 58 upwardly into engagement with the O-ring 38. Since a portion of the O-ring 38 extends below the bottom wall 40 of the seal plate 34, the upward movement of the squeeze plate 58 will deform the O-ring and cause it to expand laterally into engagement with the internal surface 41 of the lower hub section 30 of the valve fitting 28. At this point, the opening 12 through the side wall of the tank 14 is completely sealed off to permit an internal pressure test to be carried out through a different opening in the tank in usual manner. By employing the test plug 10, both the tank 14 and the piping above the tank can be tested by utilizing known procedures. It is the usual practice to test the tank at 5 p.s.i. and the piping at 25 p.s.i.

After the pressure test has been completed, the test plug 10 can be disassembled by merely reversing the above described steps. First, the hex nut 70 will be turned in its opposite direction to cause the squeeze plate 58 to move downwardly, and thereby cause the annular O-ring 38 to laterally or inwardly contract out of its sealing engagement with the internal surface 41 of the hub 30. In other words, the O-ring seal can be broken without the necessity of partially unscrewing the seal plate 34. When the O-ring seal is broken, the internal pressure is relieved by permitting the gases within the tank to exit through the hollow T-coupling 52 by passing through the space between the seal plate 34 and the squeeze plate 58, the passage 42 through the seal plate, and the hollow interior of the inserting stem 48 that communicates with the interior of the hollow T-coupling 52.

From the above discussion it should be apparent that the preferred test plug 10 of this invention can be completely threaded into the fitting 28 prior to actuation of the O-ring. In fact, the test plug 10 employs separate mechanism for inserting it into the fitting and for actuating the O-ring.

Although the invention has been described with a certain degree of particularity, it is understood that the present disclosure has been made only by way of example and that numerous changes in the details of construction and the combination and arrangement of parts may be resorted to without departing from the scope of the invention.

What is claimed is:

1. A test plug for sealing an internal passageway of a vessel preparatory to pressure testing the vessel with a fluid, the passageway including an internally threaded section and an adjacent non-threaded section, said plug including:
   a seal plate adapted to be inserted into the threaded section of the passageway, said seal plate having an externally threaded section adapted to threadedly engage the threaded section of the passageway;
   an inserting stem connected to the seal plate and extending outwardly therefrom, said stem aiding in the insertion of the seal plate into the interior of the passageway and in threadedly engaging the seal plate threaded section with the passageway threaded section;
   a compressible sealing member adjacent a lower surface of the seal plate;
   a squeeze plate underlying the sealing member and seal plate, said squeeze plate being adapted to fit within the said passageway non-threaded section and to be longitudinally movable therewithin; and
   squeeze plate actuating means for moving the squeeze plate upwardly within the passageway non-threaded section toward the seal plate for compressing the sealing member and thereby forcing said member laterally into sealing engagement with the interior surface of the vessel passageway.

2. The test plug of claim 1 including an annular groove formed in the seal plate at the said lower surface thereof, said annular groove being open in a direction facing the squeeze plate.

3. The test plug of claim 1 wherein the compressible sealing member is annular and is retained within the annular groove, said compressible sealing member extending below the lower surface of the seal plate.

4. The test plug of claim 1 wherein the squeeze plate actuating means extends upwardly through a passage in the seal plate.

5. The test plug of claim 4 wherein the inserting stem connected to the seal plate has an interior passage aligned with the passage in the seal plate and the squeeze plate actuating means extends through said interior passage.

6. The test plug of claim 5 wherein the actuating means includes an externally threaded rod.

7. The test plug of claim 4 wherein the actuating means includes an externally threaded rod.

8. The test plug of claim 7 wherein the actuating means for the squeeze plate further includes an internally threaded member rotatably engaging the external threads of the rod, said threaded member contacting a portion of the inserting stem and being rotatable relative to the rod for moving the squeeze plate upwardly into engagement with the compressible sealing member.

9. The test plug of claim 1 wherein the stem is connected at one end to the seal plate, and at its other end to a handle that is engageable for rotating the stem and seal plate.

10. The test plug of claim 9 wherein the squeeze plate actuating means extends upwardly through a passage in the seal plate.

11. The test plug of claim 10 wherein the inserting stem connected to the seal plate has an interior passage aligned with the passage in the seal plate and the squeeze plate actuating means extends through said interior passage.

12. The test plug of claim 11 wherein the actuating means includes an externally threaded rod.

13. The test plug of claim 12 wherein the externally threaded rod extends through the handle to provide an exposed threaded end, said actuating means further including an internally threaded member rotatably engaging the exposed threaded end of the rod and contacting the handle, said threaded member being rotatable relative to the rod for moving the squeeze plate upwardly into engagement with the compressible sealing member.

14. The test plug for sealing an internally threaded section in a passageway of a vessel mounted below ground level preparatory to pressure testing the vessel with a fluid wherein the passageway includes an unthreaded section adjacent the threaded section, said plug including
an externally threaded seal plate engageable in the said threaded section;
an inserting stem connected to the seal plate and extending upwardly therefrom, said stem being engageable from ground level for inserting the seal plate into the internally threaded passageway section, said stem being rotatable at ground level to thereby rotate the seal plate into engagement with the internal threads of the passageway;
an annular compressible sealing member having at least a portion thereof extending below a lower surface of the seal plate;
a non-threaded squeeze plate underlying the sealing member and the seal plate, said squeeze plate being longitudinally movable within the said unthreaded section; and
a squeeze plate actuating means connected to the squeeze plate and extending upwardly therefrom through an opening in the seal plate, said actuating means being operable at ground level when the seal plate is in threaded engagement with the vessel passageway for moving the squeeze plate upwardly toward the seal plate for compressing the sealing member and forcing it laterally into sealing engagement with the interior surface of the passageway.

15. The test plug of claim 14 wherein the seal plate is provided with an annular formed at the lower surface thereof, said annular groove being open in a direction facing the squeeze plate, and wherein the sealing member is adapted to be retained in the annular groove.

16. The test plug of claim 14 wherein the squeeze plate actuating means extends upwardly through an internal passage in the inserting stem that is connected to the seal plate.

17. The test plug of claim 16 wherein the squeeze plate actuating means extends upwardly through an internal passage in the inserting stem that is connected to the seal plate.

18. The test plug of claim 14 wherein the actuating means includes an externally threaded rod.

19. The test plug of claim 18 including an internally threaded member rotatably engaging external threads of the rod and being rotatable relative to the rod for moving the squeeze plate upwardly into engagement with the annular sealing member, the threaded member being in contact with a portion of the inserting stem.

* * * * *